Jan. 23, 1940.  O. STEINER  2,188,065
SYNCHRONIZATION OF PHOTOFLASHES WITH FOCAL PLANE SHUTTERS
Filed March 2, 1939  5 Sheets-Sheet 1
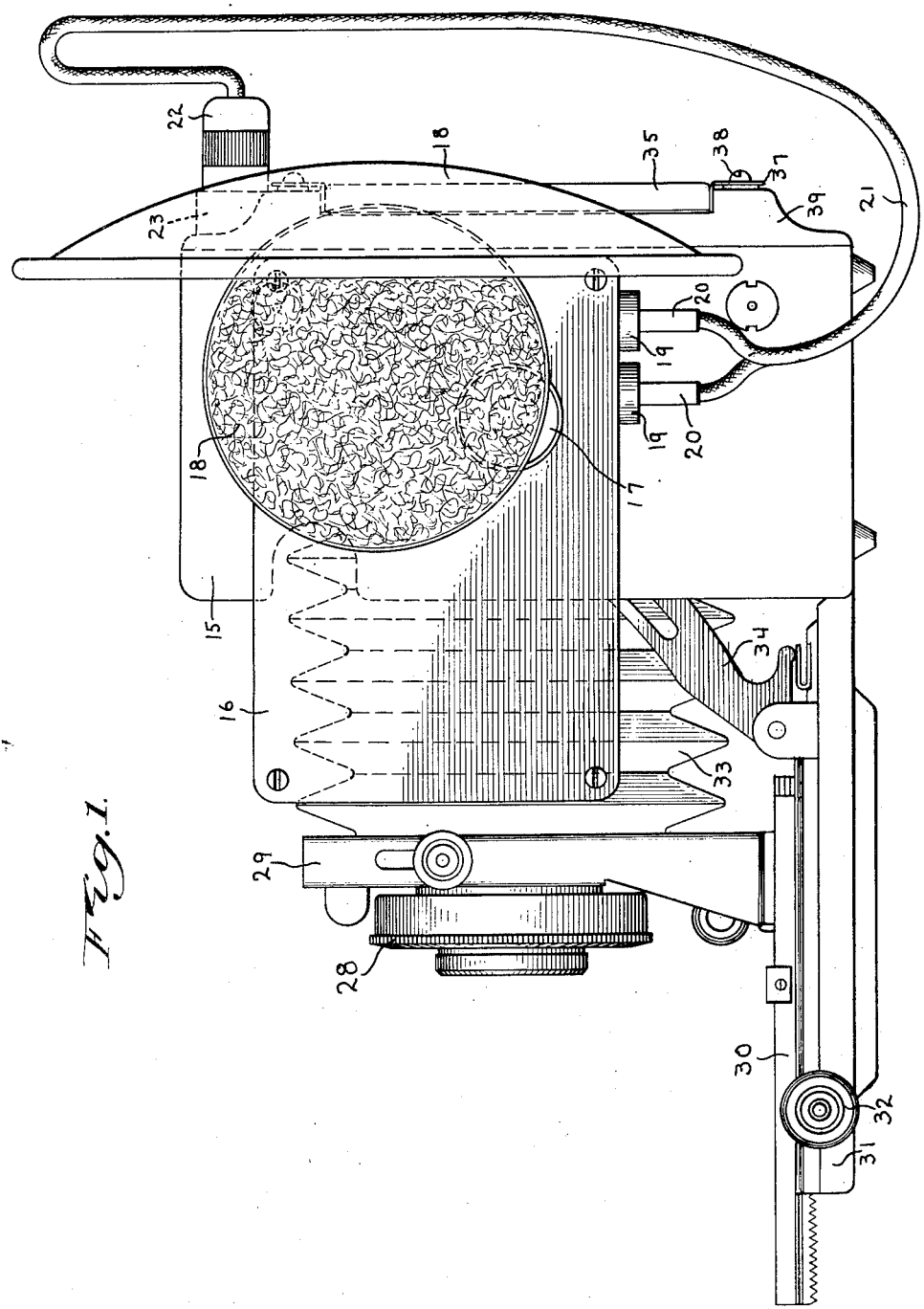
INVENTOR.
Oscar Steiner
BY Emery, Booth, Townsend, Miller & Weidner
his ATTORNEYS

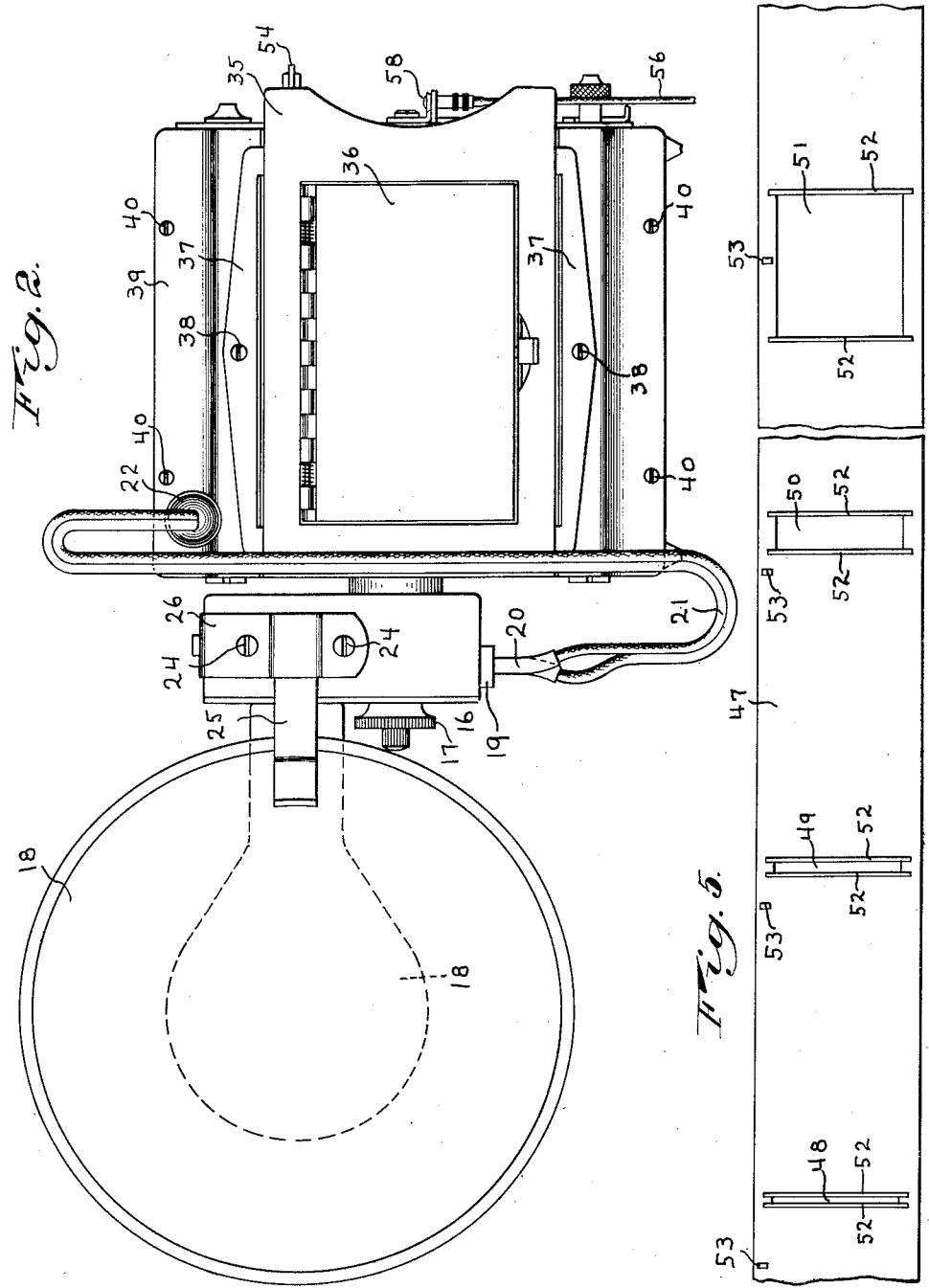

Jan. 23, 1940. O. STEINER 2,188,065
SYNCHRONIZATION OF PHOTOFLASHES WITH FOCAL PLANE SHUTTERS
Filed March 2, 1939 5 Sheets-Sheet 3
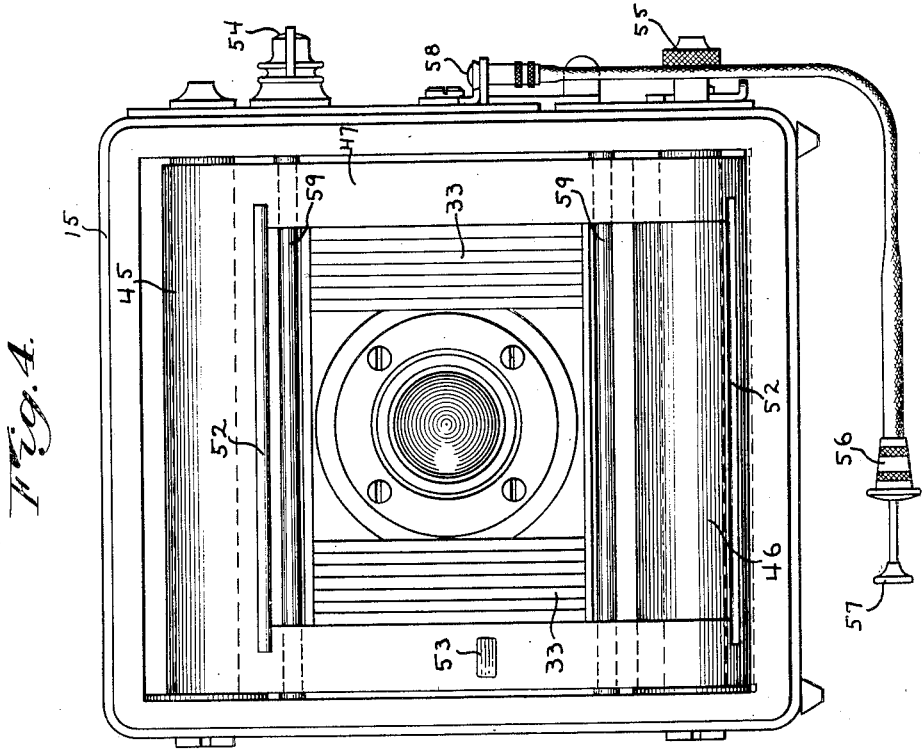
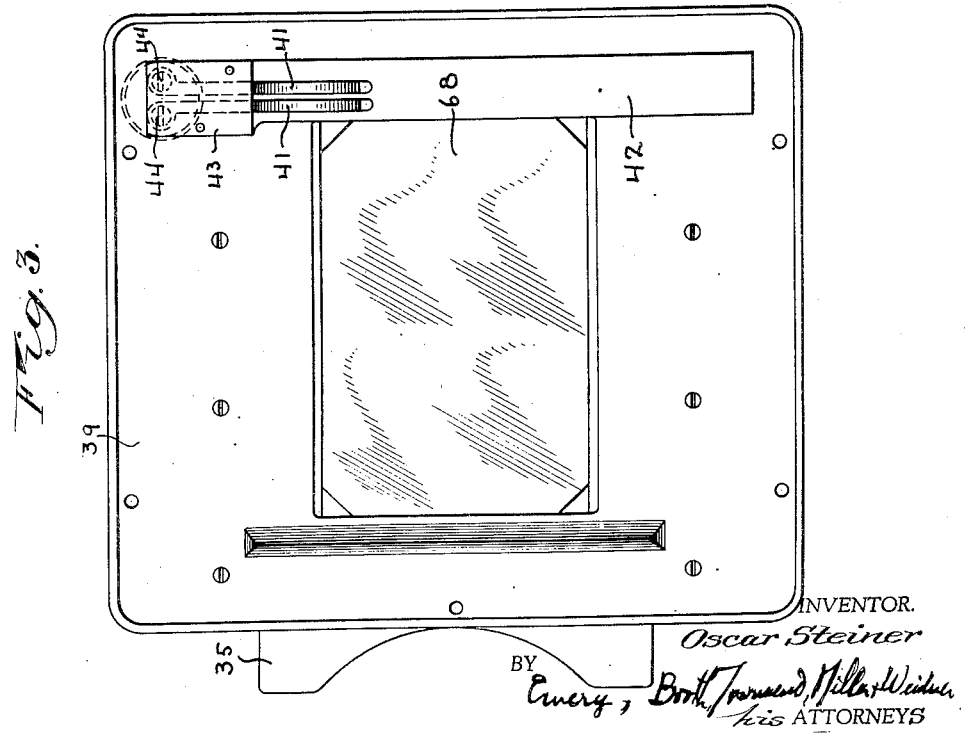
INVENTOR.
Oscar Steiner
BY
Emery, Booth, Townsend, Miller & Weidner
his ATTORNEYS

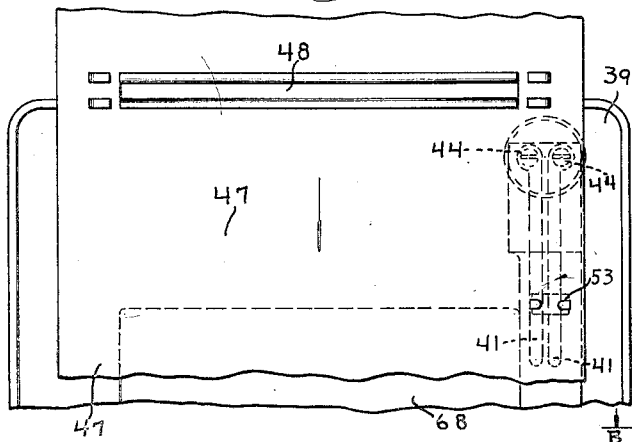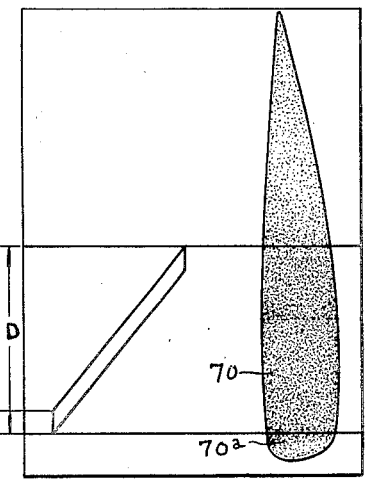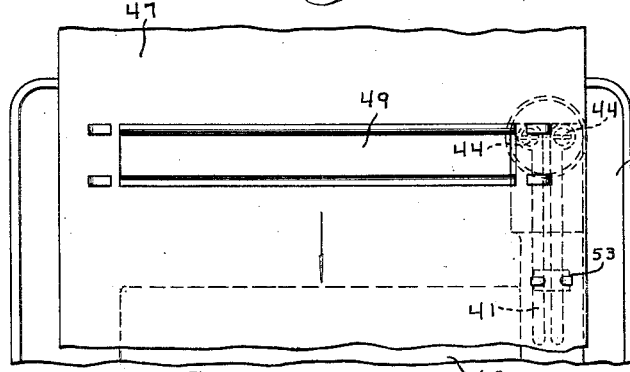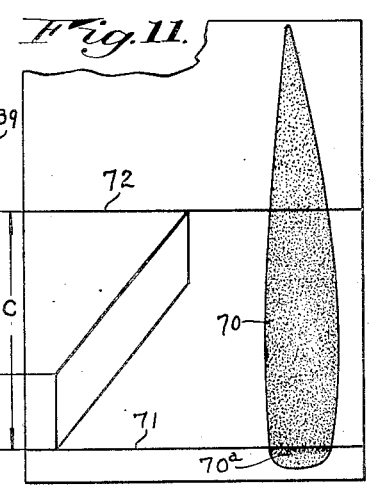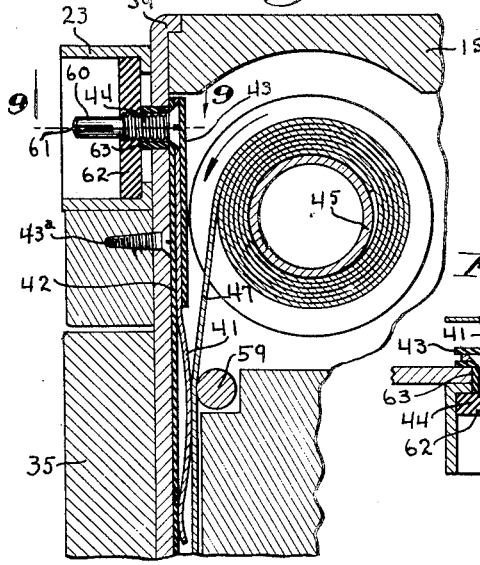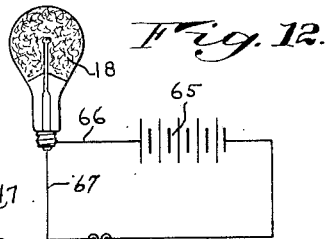

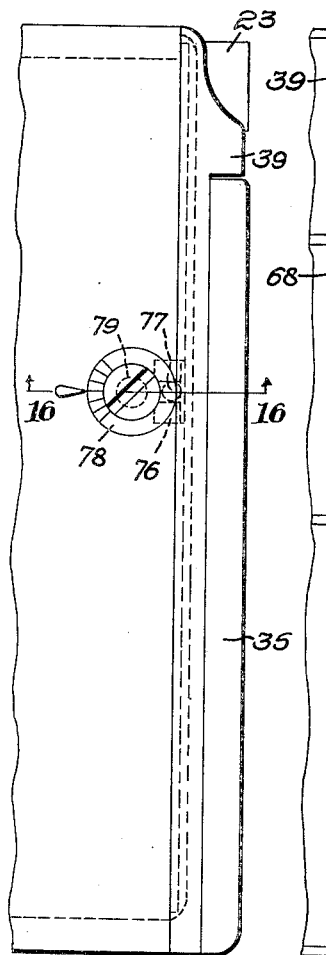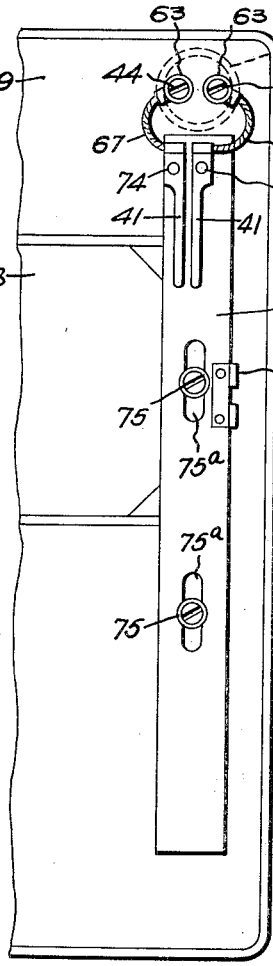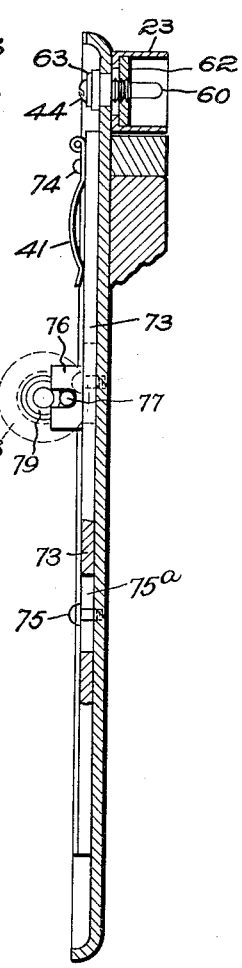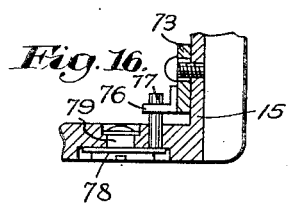

Patented Jan. 23, 1940

2,188,065

UNITED STATES PATENT OFFICE 2,188,065

SYNCHRONIZATION OF PHOTOFLASHES WITH FOCAL PLANE SHUTTERS

Oscar Steiner, Irondequoit, N. Y., assignor to The Folmer Graflex Corporation, Rochester, N. Y., a corporation of Delaware Application March 2, 1939, Serial No. 259,338

12 Claims. (Cl. 67—29)

This invention relates to photoflash synchronization, particularly as applied to focal plane shutters and includes a novel focal plane shutter as an article of manufacture, and novel camera mechanism.

In order that the principle of the invention may be readily understood I have disclosed a single embodiment thereof in the accompanying drawings, wherein—

Fig. 1 is a right side elevation of a so-called Speed Graphic camera with a photoflash synchronizer permanently positioned thereon;

Fig. 2 is a rear elevation of a photographic camera showing the position of the photoflash synchronizer with respect to the camera and also showing the connecting cord used therewith;

Fig. 3 represents in elevation the back cover plate of the camera removed from its functioning position in order to show the contact elements thereon;

Fig. 4 is a rear view of the camera showing the cover plate removed and showing the novel focal plane shutter curtain with one of its contacts in the position it occupies when the curtain is entirely open;

Fig. 5 is a partial plan view (but broken away at both ends) of a focal plane shutter of the multiple aperture type, showing several of the apertures and showing the proper position of each of the illustrated contacts thereon with relation to the aperture with which it cooperates in the synchronization of the photoflash;

Fig. 6 is a detail in plan with parts broken away representing the shutter curtain as traveling in a downward direction in said figure, and also showing the relation of a slot aperture and the position of the contact plate or element with respect to the contact members or fingers at the time of contact;

Fig. 7 is a view similar to Fig. 6 but representing the difference in positioning of the curtain contact plate or element with respect to a curtain aperture, when a larger aperture of the curtain is used;

Fig. 8 is a partial longitudinal section taken through the camera and showing one of the curtain rolls and the focal plane curtain and also showing the position of the contacts which are mounted on the back of the camera, and indicating also their relation with respect to the focal plane curtain;

Fig. 9 is a detail in section on the line 9—9 of Fig. 8, showing the construction of the contact members or fingers and the shutter curtain contact plate or element;

Fig. 10 is a chart showing the relation of the shutter opening as it travels across the focal plane in relation to the illumination that is provided by the photoflash lamp when a narrow aperture is used;

Fig. 11 is a chart similar to that of Fig. 10 but indicating the use of a larger aperture;

Fig. 12 is a circuit diagram showing the circuit through the battery lamp and the contact members or fingers;

Fig. 13 is a partial side elevation of the camera, the latter being turned 180° from the position shown in Fig. 8, to show a modified construction in which certain contacts are adjustably mounted;

Fig. 14 is a fragmentary elevation of the back cover plate similar to the right hand part of Fig. 3, but showing said modified construction in greater detail;

Fig. 15 is a detail in vertical section of the construction shown in Fig. 14, the camera being positioned as in Fig. 13; and Fig. 16 is a detail in horizontal section upon the line 16—16 of Fig. 13.

My invention comprehends synchronizing the photoflash with the shutter action and particularly with the action of a focal plane shutter. The invention also includes a novel shutter in that the shutter itself is utilized to cause the photoflash to occur during a usable part of the light curve, which usable part includes the maximum or substantially the maximum of intensity of the flash illumination.

There have been in the past numerous synchronizers built for between-the-lens shutters that operate quite satisfactorily. There have also been built several synchronizers that work on focal plane shutters of very short travel, as, for example, when used on so-called 35 mm. cameras. In such cases the duration of the opening is relatively short.

So far as I am aware, however, nothing satisfactory has been devised to synchronize a focal plane shutter with respect to the photoflash on a camera of the picture size from 2¼ x 3¼″ upward. There are many reasons why heretofore this has not been successfully accomplished. One important reason is that when attempting to synchronize a focal plane shutter of the Graflex or Speed Graphic type, which is a multiple aperture shutter, the curtain must be rolled upon a curtain roller. Such a roller, of course, increases in size as the portion of the curtain containing each aperture is wound up. The actual opening in the curtain will vary in its effective area with respect to the curtain roller itself because of the packing of the curtain on the curtain roller. Heretofore all attempts to synchronize these shutter curtains have, so far as I am aware, been along the line of the provision of means connected with the curtain roller. It is, however, impossible in my opinion to maintain a fixed point of contact or fixed relation between the shutter aperture and the curtain roller, due to the reasons certain of which I have set forth.

In accordance with my invention I cause electrical contact to take place at any predetermined point of the curtain travel with relation to the curtain aperture, and this contact point will always remain the same regardless of curtain packing on the curtain roller and regardless of the conditions of the tension roller; that is to say, regardless of whether a light tension or a heavy tension is used.

I have in the drawings illustrated one embodiment of means whereby my invention may be practised, and also a slight modification of said means. While I will describe my invention with respect to said single embodiment and said slight modification, it will, of course, be understood that my invention is not limited as to mechanism to the single embodiment, but that it may be practised with other embodiments thereof.

Referring first to Figs. 1, 2 and 3, wherein I have indicated a Speed Graphic camera, the camera box is indicated generally at 15. A synchronizer battery case therefor is indicated at 16, it being fastened to the said camera box 15 by an attaching screw or screws 17. A photoflash bulb 18 is fitted into a socket of the battery case 16. The latter has two contact sockets 19, 19, into which are fitted contact points 20, 20 attached to a cable 21. On the said cable is fitted a connector 22 which plugs into a socket 23, shown in dotted lines in Fig. 1, but more clearly shown in Fig. 9. There is also attached to the battery case 16 a reflector casing having an attached bracket 25 which, as best shown in Fig. 2, slips into a clip 26 on the battery case 16. The said clip 26 is held to the battery case by screws 24, 24. The mounting of the said reflector is most clearly shown in Fig. 2.

The camera is generally and preferably of the usual construction and is here shown as having a between-the-lens shutter 28, a front support 29, a track 30, a bed 31, focusing knobs 32, bellows 33 and spring actuated side arms 34. Being of usual construction, it is unnecessary to describe the structure of said parts in greater detail.

In Fig. 2, the focusing panel of the camera is indicated at 35 in rear elevation. The focusing panel cover is indicated at 36 and springs 37, 37 are provided which are held to the camera back by screws 38, 38. The camera back itself is indicated at 39, and it is shown as attached to the camera proper by screws 40, 40.

As shown most clearly in Fig. 3, the camera back 39 is represented as removed from the camera and reversed in position so as clearly to disclose the contact members or fingers 41, 41, the insulating strip 42 and the insulating cover strip 43. The contact members or fingers 41, 41 are attached to a suitable twin prong connector by screws 44, 44, shown in dotted lines in Fig. 3.

In Fig. 4 the camera is represented in rear elevation with the back 39 removed therefrom so as to show clearly the position of the shutter curtain rollers 45, 46, the roller 45 being the upper and the roller 46 being the lower curtain roller. The curtain itself, which is carried by the said rollers, is indicated at 47, and in Fig. 5 the said curtain (which is broken away at both ends) is represented as having four curtain apertures or openings 48, 49, 50 and 51. Other apertures may, if desired, be provided. The said curtain is preferably made of a special rubberized cloth, and each of the said apertures or openings is provided with a strut 52 at each edge of the aperture or opening. The said struts, which may be of any suitable material, act to preserve and maintain each of the apertures in its proper form or shape and condition at all times.

It will be observed that the apertures or openings 48, 49, 50, 51, differ in area, being all of the same width but of an increasing extent in the direction of travel of the curtain.

In carrying out my invention by which I effect synchronization of the photoflash with the functioning of the shutter apertures or openings, I have provided the shutter or curtain itself with means controlling the said flash. This I preferably do by providing a series of contact plates or elements 53 which are each suitably attached to the curtain 47, each in proper relation to the opening 48, 49, 50 or 51 with which it cooperates. While they may be attached in any suitable manner, I have in Fig. 9 represented the ends of a plate 53 as penetrating the curtain 47 and then bent back flatwise against the curtain at the opposite face thereof. It will be observed that the location of the several contact plates or elements 53 differs as to the spacing thereof with respect to the aperture with which it functions. It will be noted that the said plates or elements 53 respectively adjacent the apertures 48, 49, 50 are in advance thereof but to a different extent. The plate or element 53 co-acting with the narrowest aperture 48 is at a substantially greater distance in advance of said opening 48 than is the next plate or element 53 with respect to its aperture 49, and the plate or element 53 that functions with respect to the next wider aperture 50 is at a lesser distance from the leading edge of said aperture 50 than was the case with the aperture 49. The plate or element 53 that functions with respect to the aperture 51 on the contrary is shown as positioned about mid-length of the longitudinal extent of said aperture 51. The position of each of the said plates or elements 53 has been accurately determined upon as hereinafter pointed out, and this accurate prearrangement co-acts in securing the synchronization of the photoflash with each aperture.

The curtain 47 is caused to be rolled up on the curtain roller 45 by a curtain winding knob 54, clearly shown in Fig. 4. The curtain roller 46 is provided with a tension spring which can be adjusted by the tension spring knob 55. This particular structure which I preferably employ is well known and therefore it is unnecessary to show the actual construction of such parts. The said curtain 47 is released by a cable release 56, shown in Fig. 4, through pressure exerted on a suitable release button 57, causing the shutter release arm 58 to be raised. This allows the curtain 47 to travel across the exposure opening for a distance equivalent to the distance that is required to permit one aperture to pass over the opening and sufficient curtain again to cover the said opening. This cable release mechanism is a well known structure and therefore needs no further description. Any suitable shutter release mechanism may be employed.

The shutter mechanism is so constructed that any aperture can be selected for use in advance of making the exposure, and each aperture at a given tension, which is also adjustable, represents a certain exposure. The actual exposure is calculated from that time which is necessary for the respective openings 48, 49, 50, 51, etc. of curtain 47 to pass a given point at the focal plane. However, in order to make a photograph by photoflash synchronization, it is necessary for the photoflash to last a sufficient time for any given curtain opening to travel entirely across the entire exposure opening. For example, the proper opening and tension may be selected for .001 of a second, but the duration of the light flash must be sufficient to allow the curtain aperture to travel all the way across the exposure opening, and this represents approximately thirty milliseconds. Therefore, any flash lamp to be synchronized with the focal plane shutter should have a duration of flash of at least thirty milliseconds (that is .030). Photoflash bulbs with these characteristics are now commercially available.

Fig. 6 represents the curtain 47 as traveling in a direction which is downward in the said figure, and the aperture 48 has been selected as the one to be used. The contact plate or element 53 for that aperture (and the same is true with respect to the location of each contact plate or element with relation to that aperture with which it functions) is attached to the curtain 47 at such a distance from the aperture 48 as to allow for the time lag between the instant that the contact is made and the instant that the photoflash lamp is ignited, and the flash builds up to a reasonable height of illumination. This will, of course, change with each different aperture selected, as is evident from an inspection of Fig. 7 wherein the contact plate or element 53 is much closer to the aperture 49 than is the corresponding contact plate or element 53 with respect to the aperture 48 in Fig. 6. This is necessary in order to compensate for the different conditions of curtain acceleration. It is noted at this point that this fact or condition explains why it is impossible to provide a contact upon the curtain roller shaft to synchronize accurately with all speeds. For example, if a single contact is provided upon the curtain roller shaft, it may function accurately with respect to one opening, but it would be impossible to provide a contact upon the curtain roller shaft that will synchronize accurately for all the speeds and/or all sizes of apertures. If such a contact is properly set for the aperture 48, it would function too late for the aperture 49, shown in Fig. 7, and vice versa.

In Fig. 8, there is shown a cross section of the upper curtain roller 45, and it is there indicated how the curtain 47 is positioned in the camera. The said curtain passes in its travel over an idler roller 59, which may, if desired, be a stationary rod or bar. Preferably, however, I employ an idler roller. The contact members 41, 41 contact with the curtain 47 at the point of the said idler roller 59, as clearly indicated in said figure. It will readily be seen that when one of the contact plates or elements 53 passes the point to which I have just referred, a contact will be made across the contact members or fingers 41, 41, thus completing the circuit through the battery and the photoflash lamp shown in Fig. 12.

Fig. 8 also clearly indicates the manner of attaching contacts to the attachment plug 23 by the screws 44, 44, previously referred to. The said figure also indicates that the insulating plate 42 is attached to the camera back by screws 43a, though the section hatch lines somewhat obscure the screw head. The contact screws 44, 44 have each provided on their outer ends a straight portion 60, 60 with saw slots 61, 61, to insure contact in the attachment plug 22. The screws 44, 44 are screwed into an insulating plate 62 through an insulating bushing 63, thus insulating this assembly from the camera back plate 39. This construction is also clearly shown in Fig. 9.

Fig. 12 diagrammatically indicates the circuit wherein the right hand contact 41 leads through a wire 64 (shown also in Fig. 15) to the battery 65 and thence through wire 66, flash lamp 18, and wire 67 (shown also in Fig. 15) to the left hand contact 41. The wires 64 and 67 actually make up the cable that is designated as 21 in Figs. 1 and 2.

Figs. 10 and 11 are charts intended to indicate with substantial accuracy what takes place as a curtain aperture travels across the exposure opening at the time of the photoflash, which is graphically represented at 70 in said charts. The said indication 70 is a photogram of the characteristics of the illumination emitted from a flash bulb during the flashing of that bulb. The commencement of the illumination is represented at 70a, and the illumination builds up quite rapidly in intensity until it reaches a maximum. It then tapers off to no illumination at all when the lamp becomes extinguished. It is necessary to use that portion of the illustrated illumination curve in which to make the photograph, that gives enough light to expose the photographic plate. As previously stated, the curtain aperture must travel entirely across the exposure opening during that portion of the flash that represents approximately fifty percent of its peak.

Referring first to the chart Fig. 10, the distance D in Fig. 10 represents the time that it takes the curtain aperture to travel across the exposure opening in relation to the plotted illumination curve 70. The distance B in Fig. 10 represents the actual exposure; that is, it indicates the time that it takes the curtain aperture to travel past a given point in the exposure opening. The curve 70 is not an exact reproduction of the curve obtained but has been modified so as more clearly to illustrate conditions that must be met.

It will be noted that in Fig. 11 I have indicated the use of a larger curtain aperture, and the total time that the flash must be supplying illumination is slightly greater. The distance C represents in Fig. 11 the total time that it is necessary to have illumination, and the distance A represents the actual exposure time. It will be noted that curtain opening which takes place at the beginning of the exposure opening designated at 71 must be so timed that the flash has had time to build up to a light intensity sufficient to make photographs. This illumination must be maintained until point or line 72 on the exposure opening has been reached by the trailing edge of the exposure opening.

It will be understood from the foregoing description that I have provided means whereby the synchronization of a photoflash lamp can be made accurate with respect to the curtain aperture traveling across the exposure opening. Since the curtain velocities are different for different exposure openings, due to the different conditions of the curtain as wound upon the upper curtain roller, this point varies with each different exposure opening. This can readily be checked from the disclosure in Fig. 5.

All Graflex and Graphic cameras, which are the types of camera I have selected for the disclosure of my invention, are provided with a curtain opening 51 which is equal to or greater than the exposure opening of the camera and the shutter curtain normally stops when this curtain aperture is in alignment with the exposure opening in the camera. It can readily be seen that if a contact plate or element 53 is so placed that when the curtain reaches its rest position (which is the open position) a flash bulb can be caused to illuminate and the duration of the flash in the bulb itself then times the exposure, after which the curtain 47 can be allowed to close over the exposure opening 68 (Figs. 6 and 7), thus completing an exposure.

So far as I am aware, I am the first to provide a satisfactory means for accurately causing synchronization to take place between a flash bulb and a focal plane shutter using a number of different apertures, and any or all tension adjustments.

As clearly shown in Figs. 13 to 16, the contacts 41, 41 may be so mounted that they can be adjusted up and down with respect to the camera when held upright. For reasons already stated it is desirable to have means for controlling the point of contact with respect to the position of the contact elements 53, 53 on the curtain. In order to provide for such adjustment and as shown in Figs. 13 to 16, I attach the said contacts 41, 41 to a suitable slidable member 73 constructed of insulating material. The said contacts 41, 41 are secured to the said sliding member 73 in any suitable manner, as by rivets 74. Said sliding member 73 would be desirably held to the camera body by screws 75 received in lengthwise slots 75a in the sliding member 73, thus providing for an up or down adjustment. It will be readily apparent that the adjusting movement of said slidable member 73 toward the top of the camera will cause contact to take place earlier. When said slidable member 73 is adjustingly moved toward the bottom of the camera, contact will take place later. The said contact members 41, 41 are in such modified arrangement connected to the attachment plug 22, as already disclosed, by suitable wires 67, 64. I preferably provide means in such modified form of the construction for adjusting said contact members 41, 41 without dismantling the camera. For that purpose the said sliding member 73 may have a right angled lip or bent-down portion 76 engaged by a pin 77 connected to a rotatable disk 78 having a shaft 79. The said disk 78 may be graduated as shown in Fig. 13 to call for any indication that may be desired, as, for example, different types of photoflash lamps, such as General Electric lamps or Wabash lamps. It is a known fact that these lamps have different characteristics. Nevertheless the various lamps of the same manufacturers have characteristics that are nearly enough alike so that one general indication would be satisfactory for each manufacturer's lamps. Thus, if I chose to use a Wabash lamp, I would set the said indicator at an indication representing Wabash. The said contacts 41 and 41 would then be in the correct position for the proper timing for Wabash lamps. If I were, on the other hand, using General Electric lamps, the said indicator would be set for the General Electric indication, and this would provide the proper adjustment of the said contacts 41 and 41.

Having thus described one embodiment of means whereby my invention may be practised and having represented the preferred structure of the mechanism of my invention, it is to be understood that although specific terms are employed, they are used in a generic and descriptive sense and not for purposes of limitation, the scope of the invention being set forth in the following claims.

I claim:

1. As a new article capable of separate manufacture and sale for use with a photoflash lamp and camera, a multiple-aperture focal-plane curtain strip having a series of contact elements directly secured or applied to the structure of the said curtain strip, each such element being in such relation respectively to an aperture of the curtain strip that in the travel of the curtain strip in the camera an electric circuit is altered and thereby a photoflash lamp associated with the camera and said circuit is illuminated when the corresponding curtain aperture is at the exposure opening of the camera.

2. As a new article capable of separate manufacture and sale for use with a photoflash lamp and camera, a multiple-aperture focal-plane curtain strip having a series of contact elements directly secured or applied to the structure of the said curtain strip, each in such relation respectively to an aperture of the curtain strip that in the travel of the curtain strip in the camera an electric circuit is changed and thereby a photoflash lamp associated with the camera and circuit is illumined and the flash thereof is at the usable part of the light curve thereof when the functioning curtain aperture is at the exposure opening of the camera.

3. In combination, a camera having a multiple-aperture focal-plane shutter strip and an associated photoflash lamp, the said curtain having a series of contact elements each applied to the structure of the curtain itself in such relation respectively to an aperture of the curtain that in the travel of the curtain an electric circuit is altered and thereby said photoflash lamp associated with the camera is illuminated when the corresponding curtain aperture is at the exposure opening of the camera.

4. In combination, a camera having a multiple-aperture focal-plane curtain shutter strip of cloth-like material supported by rollers in the camera, and an associated photoflash lamp, the structure of the curtain strip itself having applied thereto a series of contact elements, each in such relation respectively to an aperture of the curtain strip that, in the travel of the curtain from the unwinding to the winding-up roller, an electric circuit is altered and said photoflash lamp is illuminated when the corresponding curtain aperture is at the exposure opening of the camera.

5. In combination, a camera having a multiple-aperture, focal-plane curtain shutter strip, unwinding and winding-up rollers supporting said curtain shutter strip, a photoflash lamp attached to said camera, an electric circuit including said photoflash lamp, and including also a series of contact elements passed through the structure of the curtain strip itself and bent over against the opposite face of said curtain strip, the said several contact elements being each secured to the curtain strip in such relation respectively to an aperture of the curtain strip that, in the travel of the curtain, an electric circuit is altered and said lamp is illuminated when the corresponding curtain aperture is at the exposure opening of the camera.

6. In combination, a camera having a multiple-aperture, focal-plane curtain shutter strip, unwinding and winding-up rollers supporting said curtain shutter strip, a photoflash lamp attached to said camera, an electric circuit including said photoflash lamp, and including also a series of contact members each so positioned on the structure of the curtain strip adjacent an aperture thereof as to allow for the proper time lag between the time the contact is made and the photoflash lamp is ignited and the time said flash builds up to its approximate height of illumination.

7. In combination, a camera having a multiple-aperture focal-plane curtain shutter strip, unwinding and winding-up rollers supporting said curtain shutter strip, a photoflash lamp attached to said camera, an electric circuit including said photoflash lamp, and including also a series of contact elements, each applied to the body of the curtain itself, said electric circuit also including a battery and contact members 41, 41, on the camera, together with means to press the said curtain structure against said contact members 41, 41, so that an applied contact element on the curtain structure completes the circuit and causes the illumination of the photoflash lamp when the corresponding curtain aperture is at the exposure opening of the camera.

8. In combination, a camera having a multiple-aperture focal-plane curtain shutter strip, unwinding and winding-up rollers supporting said curtain shutter strip, a photoflash lamp attached to said camera, an electric circuit including said photoflash lamp, and including also a series of contact elements, each applied to the body of the curtain itself, said electric circuit also including a battery and contact members 41, 41 on the camera, and an idler roller 59 to position the curtain in its travel against said contact members 41, 41, so that one of said contact elements on the curtain structure completes the circuit through said contact members 41, 41.

9. In combination, a camera having a multiple-aperture focal-plane curtain shutter strip, unwinding and winding-up rollers supporting said curtain shutter strip, a photoflash lamp attached to said camera, an electric circuit including said photoflash lamp, and including also a series of contact elements, each applied to the body of the curtain itself, said electric circuit also including contact members 41, 41 on the camera to be engaged by one of said contact elements applied to the curtain structure itself, said contact elements each being so positioned with respect to one of the curtain apertures that the said curtain aperture travels entirely across the exposure opening of the camera during that portion of the flash of the lamp when the circuit is completed, that represents approximately fifty percent of the peak of said flash.

10. In combination, a camera having a multiple-aperture focal-plane curtain shutter strip, unwinding and winding-up rollers supporting said curtain shutter strip, a photoflash lamp attached to said camera, an electric circuit including said photoflash lamp, and including also a series of contact elements, each applied to the body of the curtain itself, said electric circuit also including a battery and contact members 41, 41 on the camera, the position of each of said contact elements on the curtain body being such with respect to the adjacent curtain aperture that the size of that aperture is correlated to the total time the flash must be supplying proper illumination for the exposure.

11. In combination, a camera having a multiple-aperture focal-plane shutter strip for taking pictures of a dimension other than miniatures, unwinding and winding-up rollers supporting said curtain shutter strip, a photoflash lamp attached to said camera, an electric circuit including said photoflash lamp and including a series of contact elements each applied to the body of the curtain strip itself adjacent one of its apertures, contact members in the circuit on the camera body, and means to cause the circuit to be completed through one of said contact elements and said contact members at such time that the corresponding curtain aperture is at the exposure opening of the camera when the flash of the lamp is at the usable part of the light curve of the flash of such lamp.

12. In combination, a camera having a multiple-aperture focal-plane curtain shutter, unwinding and winding-up rollers supporting said curtain shutter, a photoflash lamp attached to the camera, the camera having a back 39 provided with an insulating strip 42 and with contact members 41, 41, the said curtain having applied directly thereto a series of contact elements each adjacent to one of the apertures of the curtain, so that a circuit through said lamp is completed when one of said contact elements comes into engagement with said contact members 41, 41.

OSCAR STEINER.